US011642732B1

(12) United States Patent
Sarmiento et al.

(10) Patent No.: US 11,642,732 B1
(45) Date of Patent: May 9, 2023

(54) ELECTRIC SAW

(71) Applicant: GERMANS BOADA, S.A., Rubi (ES)

(72) Inventors: Miguel Angel Sarmiento, Rubi (ES); Alek Ipatenko, Rubi (ES)

(73) Assignee: GERMANS BOADA, S.A., Rubi (ES)

(*) Notice: Subject to any disclaimer, the term of this patent is extended or adjusted under 35 U.S.C. 154(b) by 0 days.

(21) Appl. No.: 17/520,167

(22) Filed: Nov. 5, 2021

(51) Int. Cl.
*B23D 45/04* (2006.01)
*B23D 47/02* (2006.01)

(52) U.S. Cl.
CPC ........... *B23D 45/044* (2013.01); *B23D 47/02* (2013.01)

(58) Field of Classification Search
CPC ...... B23D 45/24; B23D 45/04; B23D 45/044; B23D 47/02
USPC .......................................................... 83/471
See application file for complete search history.

(56) References Cited

U.S. PATENT DOCUMENTS 9,016,180 B2 * 4/2015 Sheddy .................. B27B 27/06
83/473

FOREIGN PATENT DOCUMENTS

JP  11324478 A * 11/1999

* cited by examiner

*Primary Examiner* — Nhat Chieu Q Do
(74) *Attorney, Agent, or Firm* — Hodgson Russ LLP

(57) ABSTRACT

The invention relates to an electric saw comprising: a frame (2) mounted on a base (1), a cutting head (3) mounted on the frame by using a rotating shaft (4) in the vertical direction and an adjustable stop (5) limiting the descent of the head and the cutting depth. The adjustable stop (5) comprises: a rod (51) mounted in a through manner, with the possibility of longitudinal sliding, in a passage (53) defined in the cutting head (3) and facing a fixed stop (21) defined in the frame (2); and a screw (54) for lateral tightening and fixing of the rod (51) inside the passage (53). The screw (54) comprises an actuation knob (55) and is threadedly mounted in a hole defined in the cutting head (3) and leading into the mounting passage (53) of the rod (51).

2 Claims, 2 Drawing Sheets

ELECTRIC SAW

TECHNICAL FIELD

The present invention is applicable in the sector of cutting machines, and in particular saws, comprising a cutting head mounted on a frame by means of a shaft provided with a cutting disc and means for adjusting the lateral inclination and vertical displacement of said cutting head.

BACKGROUND

Currently, electric saws are known which comprise a frame mounted on a table for supporting the pieces to be cut, and a cutting head equipped with a cutting disc and a drive motor for driving the same.

In saws of this type, the cutting head is mounted on the frame with the possibility of rotation in the vertical direction to vary the cutting depth; further comprising a height-adjustable stop which allows limiting the descent of the head and therefore the cutting depth of the saw.

Document U.S. Pat. No. 9,016,180 describes a saw of this type, wherein the cutting head has an adjustable stop configured to limit a range of the cutting movement, specifically the descent of the head and the cutting depth carried out by the cutting disc on the piece to be cut.

In said document, the adjustable stop comprises a bolt threadedly mounted on the cutting head or on the frame of the saw; the bolt has an adjustable height and rests respectively against the frame or against the cutting head to limit the downward movement of the head and consequently the cutting depth to a greater or lesser extent.

One drawback of this adjustable stop is that adjustment of the height of the bolt is slow and laborious since every time the cutting depth is to be varied, it is necessary to rotate the bolt so that it is screwed or unscrewed on the head or on the frame, until the desired height is reached. To fix the bolt in the chosen position on the same, a locknut is mounted which must also be rotated until it contacts the head or the frame, which further increases the time needed to position and fix the adjustable stop at the chosen height.

Thus, the technical problem posed is the development of an adjustable stop that facilitates and simplifies the variation of height thereof, when the cutting depth of the saw is to be varied.

SUMMARY

The electric saw of the invention, comprising a base, a frame mounted on the base, a cutting head carrying a cutting disc and a drive motor for driving the same, a rotating shaft of the cutting head in the vertical direction to vary the cutting depth and an adjustable stop limiting the cutting depth, has technical features that considerably simplify the positioning and fixing of said stop at different heights to make cuts of different depths.

According to the invention, the aforementioned adjustable stop comprises: a smooth rod (without thread) mounted in a through manner, with the possibility of longitudinal sliding in a passage defined in the cutting head, and facing a fixed stop for supporting the rod defined on the frame of the saw; and a screw for lateral tightening and fixing of said rod inside the passage, at the desired height.

Said fixing screw comprises an actuation knob and is threadedly mounted in a threaded hole defined in the cutting head and leading into the mounting passage of the rod limiting the cutting depth.

The fixing screw, the threaded hole and the threads thereof are dimensioned to fix or release the rod quickly, by rotating the screw less than 180°.

The passage for mounting the rod is oriented vertically, and has adequate clearance for mounting and lowering the rod, by gravity, therein, so that it is enough to release the rod while the cutting head is in the upper resting position, such that said rod descends by gravity until it contacts the fixed stop of the frame. To adjust the cutting depth, it is enough to lower the head until the desired cutting depth is reached and fix the rod by rotating the actuation knob of the screw in the tightening direction.

This operation is particularly fast and simple, since it is enough to release the rod and lower the cutting head to the cutting height desired by the user, such that said rod is automatically placed in the corresponding position with respect to the head. Once fixed in said position, the rod prevents the cutting head from descending beyond the position previously chosen by the user, making successive cuts with the same depth.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
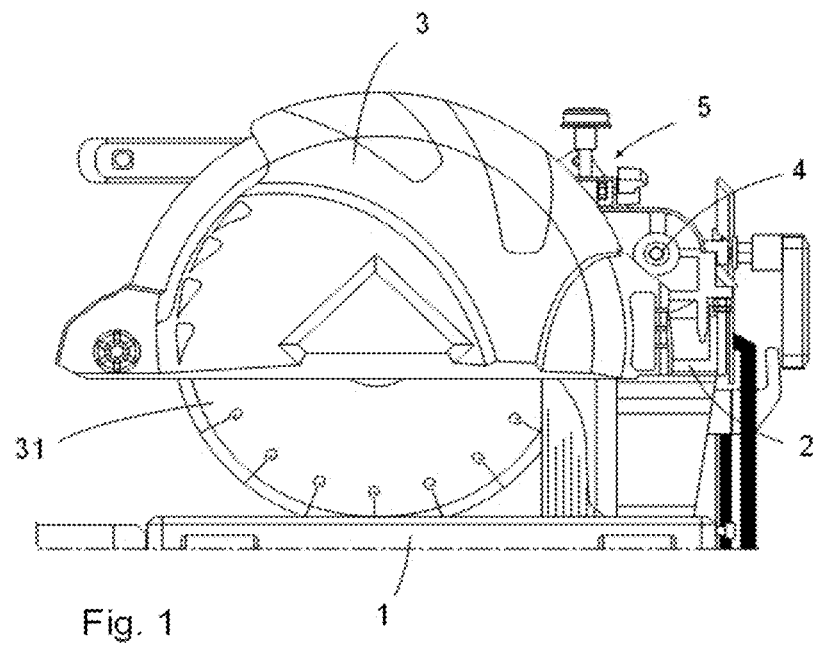
FIG. 1 shows a profile view of an exemplary embodiment of the electric saw of the invention, wherein the rotating shaft of the cutting head in the vertical direction and the adjustable stop for adjusting the cutting depth can be observed.

As can be seen in FIG. 1, the electric saw of the invention comprises a base (1), a frame (2) mounted on the base and a cutting head (3) carrying a cutting disc (31) driven by an electric motor.

Said cutting head (3) is mounted on the frame (2) by means of a rotating shaft (4) in the vertical direction, to enable cuts of different depths to be made.

The cutter comprises an adjustable stop, limiting the cutting depth, referenced as a whole as (5).

The aforementioned adjustable stop (5) comprises: a smooth, non-threaded rod (51), provided at the upper end thereof with a knob (52) and mounted in a through manner, with the possibility of longitudinal sliding, in a passage (53) defined in the cutting head (3), and facing a fixed stop (21) defined on the frame (2); the aforementioned adjustable stop (5) comprises a screw (54) for lateral tightening and fixing of said rod (51) at the desired height.

Said screw (54) for lateral tightening and fixing of the rod (51) comprises an actuation knob (55) and is mounted in a threaded hole defined in the cutting head (3) and leading into the mounting passage (53) of the rod (51).

In the example shown, the rod (51) has a flat face (51a) facing the screw (54) for lateral tightening and fixing of said rod (51).

The fixing screw (54) and the threads of said screw and of the threaded mounting hole thereof are dimensioned to fix or release the rod quickly, by rotating the actuation knob (55) of an amplitude less than 180°.

Figure 2:
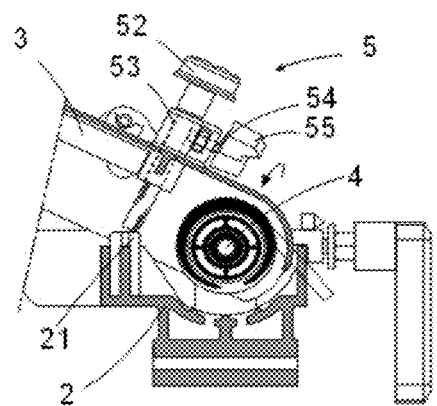
FIGS. 2 to 4 show partial profile views of the saw of FIG. 1, sectioned along a vertical plane, wherein the cutting head and the adjustable stop can be seen in different positions.

As shown in FIG. 2, the passage (53) is oriented vertically in a vertical plane, so that when the actuation knob (55) is rotated in a direction of loosening the screw (54), the rod (51) descends by gravity until it rests with the end thereof on the fixed stop (21) of the frame (2).

Figure 3:
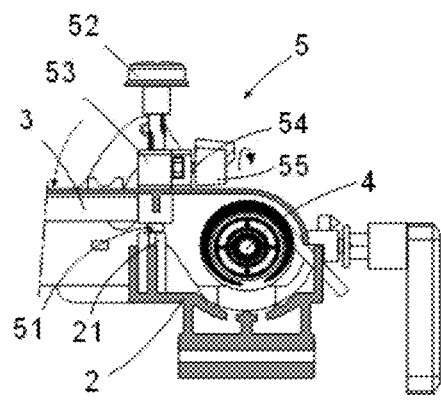
Figure 4:
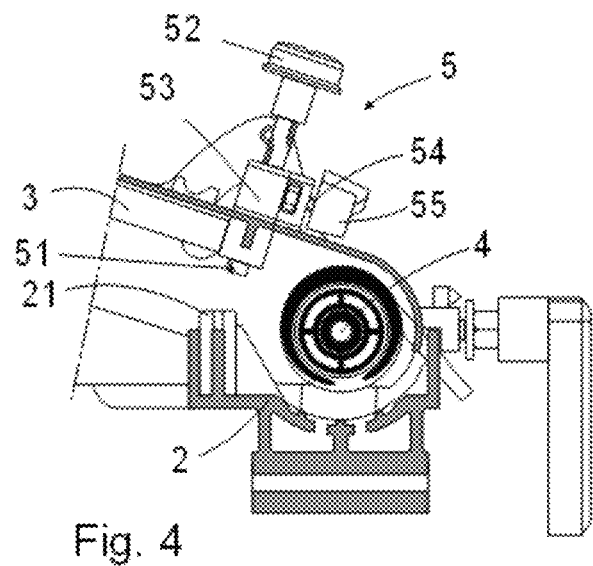
Figure 5:
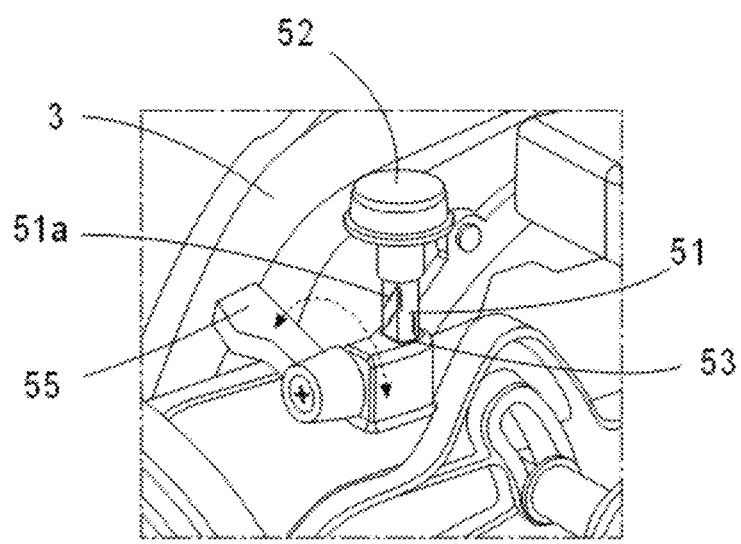
FIG. 5 shows a perspective detail view of the adjustable stop for adjusting the cutting depth.

As shown in FIG. 3, when lowering the cutting head (3) to the desired cutting depth, the height position of the rod (51) is automatically adjusted with respect to the cutting head (3), it being enough to rotate the actuation knob (55) in the direction of tightening the screw (54) such that the rod (51) is fixed in the chosen position and remains in the same relative position with respect to the cutting head (3), as shown in FIG. 5, to make successive cuts at the previously selected depth.

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. An electric saw, comprising:
    a base, a frame mounted on the base, a cutting head including a motor configured to rotate a cutting disc and mounted on the frame via a rotating shaft of the cutting head in a vertical direction, and an adjustable stop limiting a descent of the cutting head and the cutting depth;
    wherein the adjustable stop comprises:
        a non-threaded rod provided with an actuation knob, mounted in a through manner, to allow longitudinal sliding, in a passage defined in the cutting head and facing a fixed stop defined on the frame; and
        a screw configured to laterally tighten and fix said rod inside the passage, said screw being provided with an actuation knob and mounted in a threaded hole defined in the cutting head and leading into the passage in which the rod is mounted;
    wherein the non-threaded rod has a flat face along its entire length, said flat face being aligned with a corresponding flat face of the passage and facing the screw for the screw to laterally tighten and fix said rod within the passage and wherein the passage is oriented in a vertical plane and configured to allow the rod to mount and lower by gravity therein when the actuation knob of the screw is rotated in a direction of loosening the screw.

2. The electric saw according to claim 1, wherein the screw, threads of said screw and threads of the threaded hole in which the screw is mounted are dimensioned to fix or release the rod by rotating the actuation knob of the screw less than 180°.

* * * * *